United States Patent
Barron et al.

(10) Patent No.: US 9,571,968 B1
(45) Date of Patent: Feb. 14, 2017

(54) GEO-FENCE MANAGEMENT USING A CLUSTER ANALYSIS TECHNIQUE

(71) Applicant: International Business Machines Corporation, Armonk, NY (US)

(72) Inventors: Gilbert Barron, South Salem, NY (US); Michael J. Bordash, Newtown, CT (US); Louis F. Roehrs, Mountain View, CA (US); Zachary P. Slayton, New York, NY (US); Anurag Srivastava, Pune (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/804,334

(22) Filed: Jul. 21, 2015

(51) Int. Cl.
*H04W 24/00* (2009.01)
*H04W 4/02* (2009.01)
*H04W 16/00* (2009.01)

(52) U.S. Cl.
CPC ............ *H04W 4/021* (2013.01); *H04W 16/00* (2013.01)

(58) Field of Classification Search
USPC ................... 455/404.2, 410–411, 418–422.1, 455/456.1–456.3, 461, 40–41.2
See application file for complete search history.

(56) References Cited

U.S. PATENT DOCUMENTS

| | | | |
|---|---|---|---|
| 8,018,329 B2 | 9/2011 | Morgan et al. | |
| 8,755,824 B1 | 6/2014 | Wang et al. | |
| 8,812,024 B2 | 8/2014 | Obermeyer et al. | |
| 2009/0267867 A1* | 10/2009 | Gonia | G06F 3/1454 345/1.1 |
| 2011/0136468 A1* | 6/2011 | McNamara | G06Q 20/14 455/406 |
| 2012/0140954 A1* | 6/2012 | Ranta | H04R 3/04 381/107 |
| 2013/0097054 A1* | 4/2013 | Breitenbach | G06Q 30/06 705/26.8 |
| 2014/0045516 A1 | 2/2014 | Turgman et al. | |
| 2014/0155094 A1 | 6/2014 | Zises | |
| 2014/0164118 A1 | 6/2014 | Polachi | |
| 2014/0258201 A1 | 9/2014 | Finlow-Bates | |
| 2014/0274362 A1* | 9/2014 | Dhawan | G07F 17/3276 463/29 |
| 2014/0278090 A1* | 9/2014 | Boes | G01C 21/3476 701/533 |

(Continued)

*Primary Examiner* — Dai A Phuong
(74) *Attorney, Agent, or Firm* — Kevin Kehe

(57) ABSTRACT

Disclosed aspects include geo-fence management using a cluster analysis technique. A set of dynamic user data is received from a set of users. The set of dynamic user data may have identification information which identifies one or more users, location information which indicates location for one or more users, and context information which indicates application context for one or more users. The cluster analysis technique may be used to process the set of dynamic user data. Accordingly, a geo-fence opportunity event is detected using the cluster analysis technique. Based on a selection criterion with respect to the geo-fence opportunity event, it is determined to provide an opportunity for a subset of the set of users. In response to making the determination, the opportunity can be provided for/to the subset of the set of users (e.g., sending a notification to the subset of the set of users).

19 Claims, 7 Drawing Sheets

(56) References Cited

U.S. PATENT DOCUMENTS

| | | | | |
|---|---|---|---|---|
| 2015/0179077 A1* | 6/2015 | Morgan | ............... | H04W 4/021 |
| | | | | 340/989 |
| 2015/0350351 A1* | 12/2015 | Tung | ..................... | H04L 67/18 |
| | | | | 709/204 |
| 2016/0135005 A1* | 5/2016 | Saha | .................... | H04W 4/021 |
| | | | | 455/456.1 |
| 2016/0255143 A1* | 9/2016 | Hunt | .................... | H04L 67/104 |

* cited by examiner

GEO-FENCE MANAGEMENT USING A CLUSTER ANALYSIS TECHNIQUE

BACKGROUND

This disclosure relates generally to computer systems and, more particularly, relates to geo-fence management. Managing geo-fences (e.g., virtual barriers) may be desired to be performed as efficiently as possible. The amount of data that needs to be managed by enterprises related to geo-fences is increasing. As data needing to be managed increases, the need for management efficiency may increase.

SUMMARY

Disclosed aspects include geo-fence management using a cluster analysis technique. A set of dynamic user data is received from a set of users. The set of dynamic user data may have identification information which identifies one or more users, location information which indicates location for one or more users, and context information which indicates application context for one or more users. The cluster analysis technique may be used to process the set of dynamic user data. Accordingly, a geo-fence opportunity event is detected using the cluster analysis technique. Based on a selection criterion with respect to the geo-fence opportunity event, it is determined to provide an opportunity for a subset of the set of users. In response to making the determination, the opportunity can be provided for/to the subset of the set of users (e.g., sending a notification to the subset of the set of users).

In embodiments, the set of dynamic user data may be received by a service which supports user registration, selection criteria, opportunity notification, and an interface for a management-user. The management-user can select the cluster analysis technique or the selection criterion. The cluster analysis technique may utilize demographic information with respect to real-time location events to offer opportunities for engagement or analytics. In various embodiments, the cluster analysis technique supports geo-fencing based on location and proximity data. Altogether, performance or efficiency benefits may result from geo-fence management using a cluster analysis technique.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
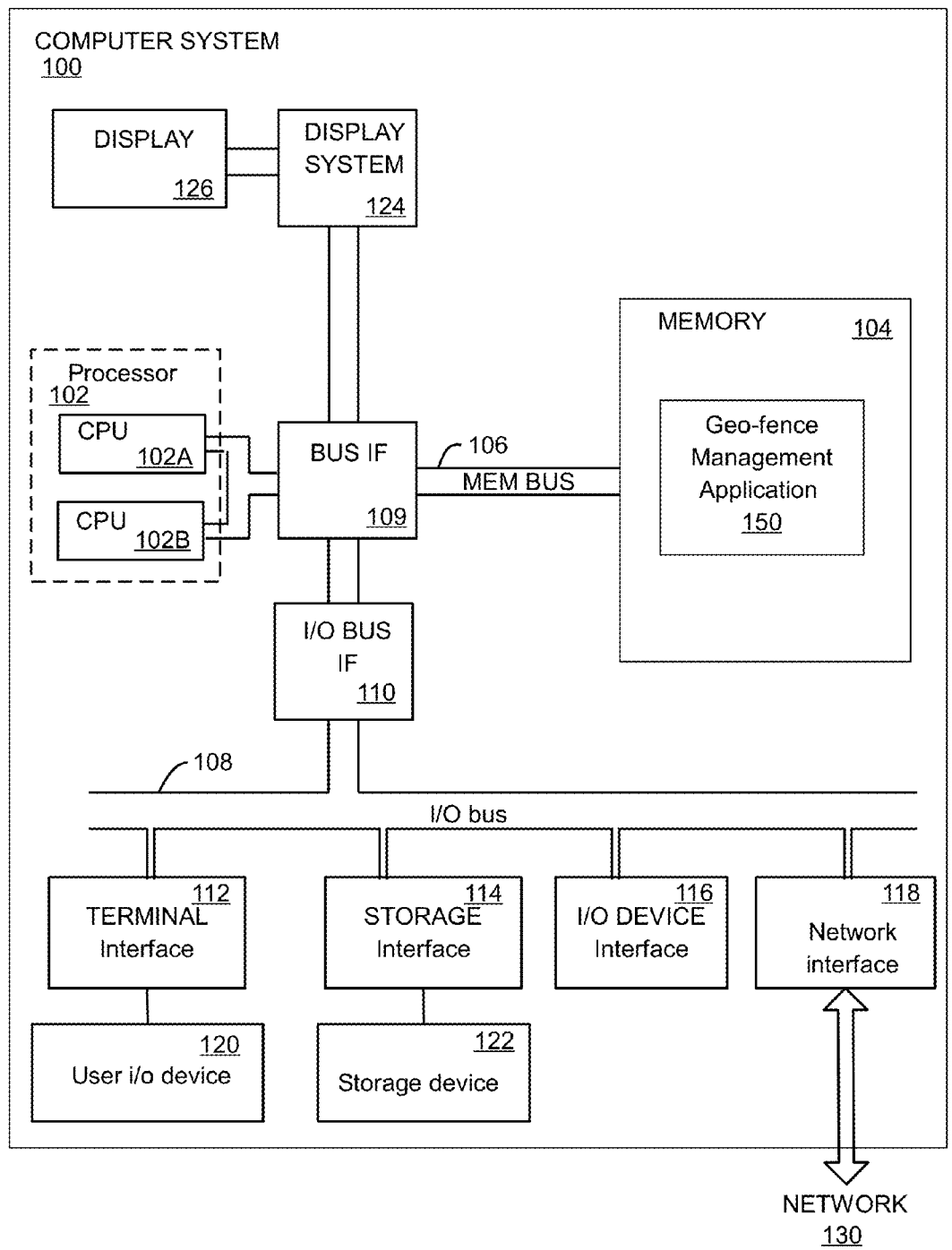
FIG. 1 depicts a high-level block diagram of a computer system for implementing various embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the disclosure relate to determining a location for a geo-fence region using a cluster analysis technique. For example, a user may desire to be alerted to opportunities for geo-fencing without the need to execute location analytics routines on historical data. For instance, if a confluence of a certain demographic which have opted-in to location sharing in an application are concentrated around a geo-location, aspects of the disclosure can alert the user of the opportunity to geo-fence the area for messaging engagement. Aspects can monitor/search for interesting concentrations of devices using various cluster algorithms.

A geo-fence includes a virtual barrier which may use various technologies to define geographical boundaries for a software program. Geo-fences can be utilized to determine consumer interest in stores with respect to delivering targeted advertisements. Aspects may apply to custom non-earth spaces such as stores, or virtual arenas defined by customers and application developers. Determining where to place the geo-fences can be challenging. Aspects of the disclosure include a methodology to allocate, apportion, or distribute geo-fence regions.

Aspects of the disclosure include a method, system, and computer program product of geo-fence management using a cluster analysis technique. A set of dynamic user data is received from a set of users. The set of dynamic user data may have identification information which identifies one or more users, location information which indicates location for one or more users, and context information which indicates application context for one or more users. The cluster analysis technique may be used to process the set of dynamic user data. Accordingly, a geo-fence opportunity event is detected using the cluster analysis technique. Based on a selection criterion with respect to the geo-fence opportunity event, it is determined to provide an opportunity for a subset of the set of users. In response to making the determination, the opportunity can be provided for/to the subset of the set of users (e.g., sending a notification to the subset of the set of users).

In embodiments, the cluster analysis technique utilizes demographic information with respect to real-time location events to offer opportunities for engagement or analytics. The cluster analysis technique may support geo-fencing with respect to an array of points (a polygon), a radius from a point (a circle), or the like. In various embodiments, the cluster analysis technique supports geo-fencing based on location and proximity data using technologies such as near field communication (NFC), tags, radio-frequency identification (RFID), a wireless local area network (WLAN/Wi-Fi), cell, sensor, or beacon.

In embodiments, the set of dynamic user data includes real-time user data. The set of dynamic user data may be received by a service which supports user registration, selection criteria, opportunity notification, and an interface for a management-user. The management-user can select the cluster analysis technique or the selection criterion. Altogether, performance or efficiency benefits (e.g., speed, flexibility, responsiveness, resource usage) may result from geo-fence management using a cluster analysis technique. Accordingly, aspects may save resources such as bandwidth, processing, or memory.

Turning now to the figures, FIG. 1 depicts a high-level block diagram of a computer system for implementing various embodiments of the present disclosure, consistent with various embodiments. The mechanisms and apparatus of the various embodiments disclosed herein apply equally to any appropriate computing system. The major components of the computer system 100 include one or more processors 102, a memory 104, a terminal interface 112, a storage interface 114, an I/O (Input/Output) device interface 116, and a network interface 118, all of which are communicatively coupled, directly or indirectly, for inter-component communication via a memory bus 106, an I/O bus 108, bus interface unit 109, and an I/O bus interface unit 110.

The computer system 100 may contain one or more general-purpose programmable central processing units (CPUs) 102A and 102B, herein generically referred to as the processor 102. In embodiments, the computer system 500 may contain multiple processors; however, in certain embodiments, the computer system 100 may alternatively be a single CPU system. Each processor 102 executes instructions stored in the memory 104 and may include one or more levels of on-board cache.

In embodiments, the memory 104 may include a random-access semiconductor memory, storage device, or storage medium (either volatile or non-volatile) for storing or encoding data and programs. In certain embodiments, the memory 104 represents the entire virtual memory of the computer system 100, and may also include the virtual memory of other computer systems coupled to the computer system 100 or connected via a network. The memory 104 can be conceptually viewed as a single monolithic entity, but in other embodiments the memory 104 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The memory 104 may store all or a portion of the various programs, modules and data structures for processing data transfers as discussed herein. For instance, the memory 104 can store a geo-fence management application 150. In embodiments, the geo-fence management application 150 may include instructions or statements that execute on the processor 102 or instructions or statements that are interpreted by instructions or statements that execute on the processor 102 to carry out the functions as further described below. In certain embodiments, the geo-fence management application 150 is implemented in hardware via semiconductor devices, chips, logical gates, circuits, circuit cards, and/or other physical hardware devices in lieu of, or in addition to, a processor-based system. In embodiments, the geo-fence management application 150 may include data in addition to instructions or statements.

The computer system 100 may include a bus interface unit 109 to handle communications among the processor 102, the memory 104, a display system 124, and the I/O bus interface unit 110. The I/O bus interface unit 110 may be coupled with the I/O bus 108 for transferring data to and from the various I/O units. The I/O bus interface unit 110 communicates with multiple I/O interface units 112, 114, 116, and 118, which are also known as I/O processors (IOPs) or I/O adapters (IOAs), through the I/O bus 108. The display system 124 may include a display controller, a display memory, or both. The display controller may provide video, audio, or both types of data to a display device 126. The display memory may be a dedicated memory for buffering video data. The display system 124 may be coupled with a display device 126, such as a standalone display screen, computer monitor, television, or a tablet or handheld device display. In one embodiment, the display device 126 may include one or more speakers for rendering audio. Alternatively, one or more speakers for rendering audio may be coupled with an I/O interface unit. In alternate embodiments, one or more of the functions provided by the display system 124 may be on board an integrated circuit that also includes the processor 102. In addition, one or more of the functions provided by the bus interface unit 109 may be on board an integrated circuit that also includes the processor 102.

The I/O interface units support communication with a variety of storage and I/O devices. For example, the terminal interface unit 112 supports the attachment of one or more user I/O devices 120, which may include user output devices (such as a video display device, speaker, and/or television set) and user input devices (such as a keyboard, mouse, keypad, touchpad, trackball, buttons, light pen, or other pointing device). A user may manipulate the user input devices using a user interface, in order to provide input data and commands to the user I/O device 120 and the computer system 100, and may receive output data via the user output devices. For example, a user interface may be presented via the user I/O device 120, such as displayed on a display device, played via a speaker, or printed via a printer.

The storage interface 114 supports the attachment of one or more disk drives or direct access storage devices 122 (which are typically rotating magnetic disk drive storage devices, although they could alternatively be other storage devices, including arrays of disk drives configured to appear as a single large storage device to a host computer, or solid-state drives, such as flash memory). In some embodiments, the storage device 122 may be implemented via any type of secondary storage device. The contents of the memory 104, or any portion thereof, may be stored to and retrieved from the storage device 122 as needed. The I/O device interface 116 provides an interface to any of various other I/O devices or devices of other types, such as printers or fax machines. The network interface 118 provides one or more communication paths from the computer system 100 to other digital devices and computer systems; these communication paths may include, e.g., one or more networks 130.

Although the computer system 100 shown in FIG. 1 illustrates a particular bus structure providing a direct communication path among the processors 102, the memory 104, the bus interface 109, the display system 124, and the I/O bus interface unit 110, in alternative embodiments the computer system 100 may include different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface unit 110 and the I/O bus 108 are shown as single respective units, the computer system 100 may, in fact, contain multiple I/O bus interface units 110 and/or multiple I/O buses 108. While multiple I/O interface units are shown, which separate the I/O bus 108 from various communications paths running to the various I/O devices, in other embodiments, some or all of the I/O devices are connected directly to one or more system I/O buses.

In various embodiments, the computer system 100 is a multi-user mainframe computer system, a single-user system, or a server computer or similar device that has little or no direct user interface, but receives requests from other computer systems (clients). In other embodiments, the computer system 100 may be implemented as a desktop computer, portable computer, laptop or notebook computer, tablet computer, pocket computer, telephone, smart phone, or any other suitable type of electronic device.

FIG. 1 depicts several major components of the computer system 100. Individual components, however, may have greater complexity than represented in FIG. 1, components other than or in addition to those shown in FIG. 1 may be present, and the number, type, and configuration of such components may vary. Several particular examples of additional complexity or additional variations are disclosed herein; these are by way of example only and are not necessarily the only such variations. The various program components illustrated in FIG. 1 may be implemented, in various embodiments, in a number of different manners, including using various computer applications, routines, components, programs, objects, modules, data structures, etc., which may be referred to herein as "software," "computer programs," or simply "programs."

Figure 2:
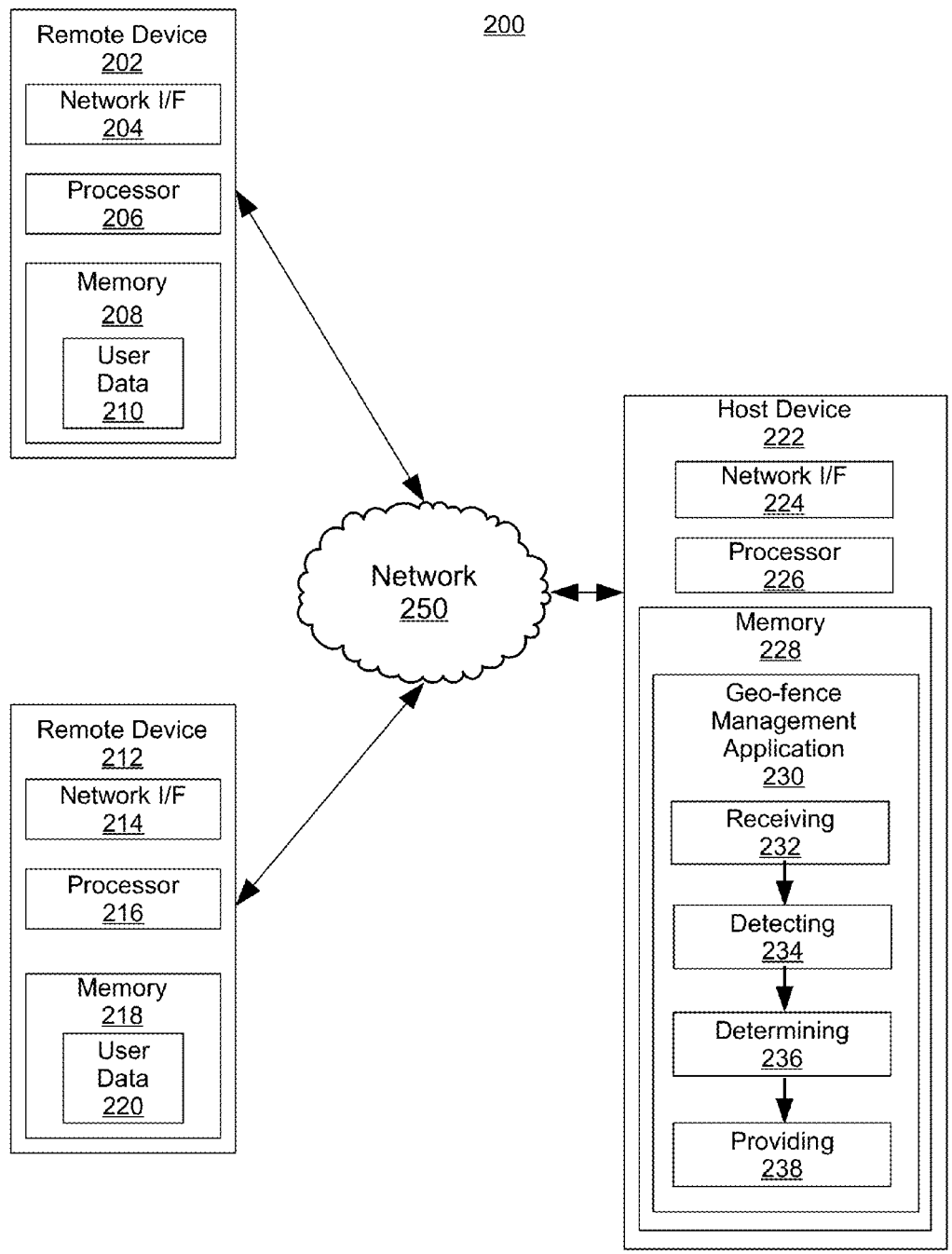
FIG. 2 is a diagrammatic illustration of an example computing environment according to embodiments.

FIG. 2 is a diagrammatic illustration of an example computing environment 200, consistent with embodiments of the present disclosure. In certain embodiments, the environment 200 can include one or more remote devices 202, 212 and one or more host devices 222. Remote devices 202, 212 and host device 222 may be distant from each other and communicate over a network 250 in which the host device 222 comprises a central hub from which remote devices 202, 212 can establish a communication connection. Alternatively, the host device and remote devices may be configured in any other suitable relationship (e.g., in a peer-to-peer or other relationship).

In certain embodiments the network 250 can be implemented by any number of any suitable communications media (e.g., wide area network (WAN), local area network (LAN), Internet, Intranet, etc.). Alternatively, remote devices 202, 212 and host devices 222 may be local to each other, and communicate via any appropriate local communication medium (e.g., local area network (LAN), hardwire, wireless link, Intranet, etc.). In certain embodiments, the network 250 can be implemented within a cloud computing environment, or using one or more cloud computing services. Consistent with various embodiments, a cloud computing environment can include a network-based, distributed data processing system that provides one or more cloud computing services. In certain embodiments, a cloud computing environment can include many computers, hundreds or thousands of them, disposed within one or more data centers and configured to share resources over the network.

Consistent with various embodiments, host device 222 and remote devices 202, 212 may be computer systems preferably equipped with a display or monitor. In certain embodiments, the computer systems may include at least one processor 206, 216, 226 memories 208, 218, 228 and/or internal or external network interface or communications devices 204, 214, 224 (e.g., modem, network cards, etc.), optional input devices (e.g., a keyboard, mouse, or other input device), and other commercially available and custom software (e.g., browser software, communications software, server software, natural language processing software, search engine and/or web crawling software, filter modules for filtering content based upon predefined criteria, etc.). In certain embodiments, the computer systems may include server, desktop, laptop, and hand-held devices.

In certain embodiments, remote devices 202, 212 may include user data 210, 220. The user data 210, 220 may include information about a user which is configured to be communicated to the host device 222 for processing. As described herein, a geo-fence management application 230 of the host device 222 may be configured to utilize user data 210, 220 and a cluster analysis technique to provide chosen users with an opportunity. The geo-fence management application 230 may have a set of operations. The set of operations can include a receiving operation 232, a detecting operation 234, a determining operation 236, and a providing operation 238.

Figure 3:
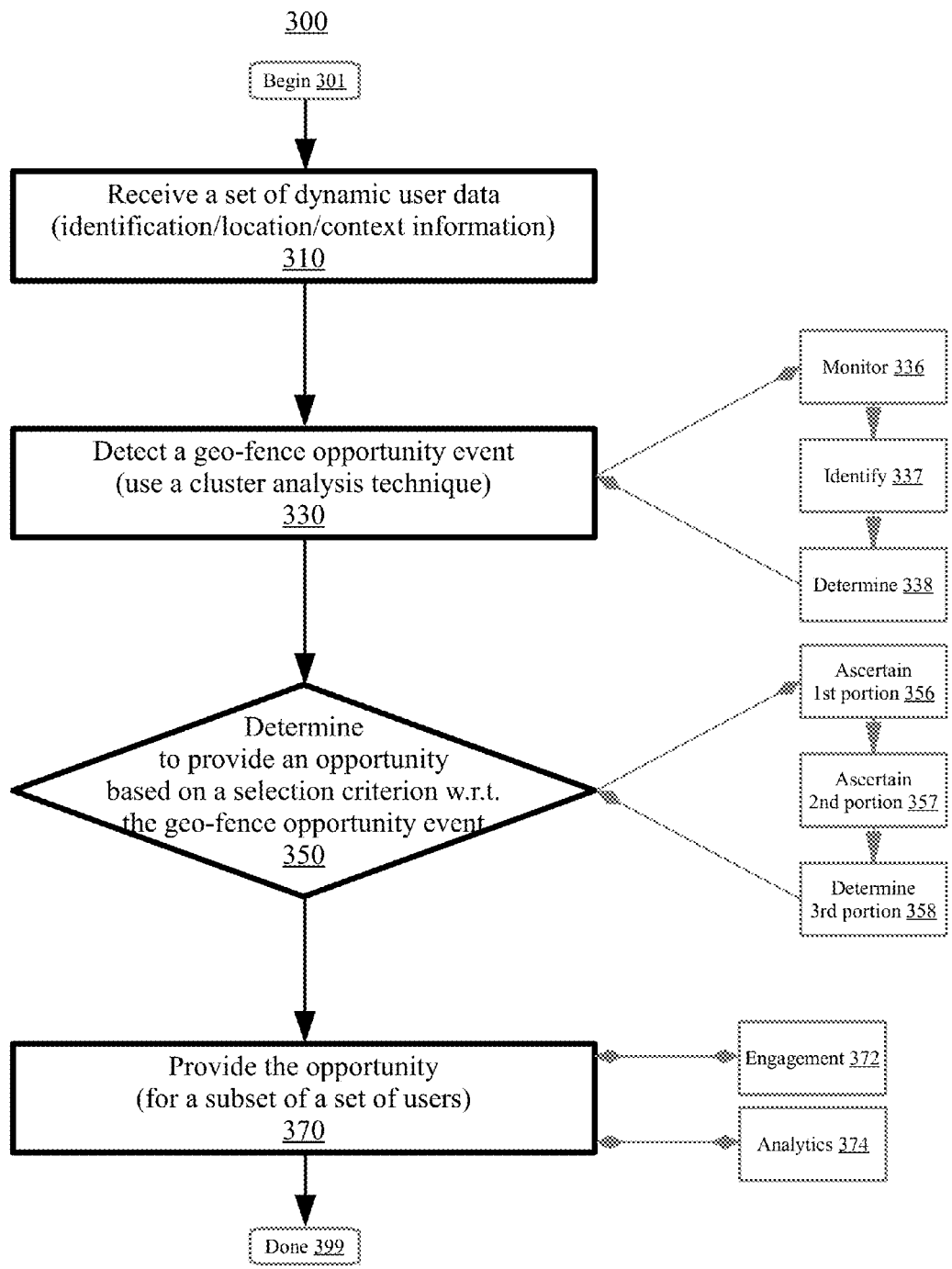
FIG. 3 is a flowchart illustrating a method of geo-fence management using a cluster analysis technique according to embodiments.

FIG. 3 is a flowchart illustrating a method 300 of geo-fence management using a cluster analysis technique according to embodiments. A service which supports user registration, selection criteria, opportunity notification, or an interface for a management-user may be utilized (e.g., to receive data/information). In embodiments, the management-user can select the cluster analysis technique (e.g., grouping of data objects by similarity) or the selection criteria. Method 300 may begin at block 301.

At block 310, a set of dynamic user data is received from a set of users. The set of dynamic user data can include real-time user data. In general, the set of dynamic user data includes identification information, location information, or context information. The identification information identifies one or more users (e.g., utilizing a unique device/user identifier). The location information indicates location for one or more users (e.g., utilizing various geographic/proximity positioning techniques). The context information indicates application context for one or more users (e.g., configuration parameters).

At block 330, the set of dynamic user data is processed using the cluster analysis technique and a geo-fence opportunity event is detected. The cluster analysis technique (e.g., k-means clustering) may utilize demographic information with respect to real-time location events to offer opportunities for engagement (e.g., commodity/service purchase) or analytics (e.g., region demographics). In embodiments, the cluster analysis technique supports geo-fencing based on location and proximity data using at least one technology. Example technologies include near field communication (NFC), tags, radio-frequency identification (RFID), a wireless local area network (WLAN/Wi-Fi), cell, sensor, or beacon. The cluster analysis technique can support geo-fencing with respect to a polygon (e.g., an array of points), a circle (e.g., a radius from a point), or the like (e.g., ellipse).

In embodiments, the geo-fence opportunity event includes a concentration (e.g., density) of the subset of users with respect to a geo-location. In embodiments, detecting the geo-fence opportunity event includes a set of operations. The set of dynamic user data may be monitored for a triggering event (e.g., a threshold number of users having a particular application context parameter) at block 336.

Based on the triggering event with respect to the set of dynamic user data, a trend (e.g., a flow/movement pattern of the users with the particular application context parameter) can be identified at block 337. By comparing the trend with a group of opportunity events, it can be determined that the trend indicates the geo-fence opportunity event (e.g., a tailored offer may receive a positive response by certain users) at block 338.

At block 350, a determination is made to provide an opportunity for a subset of the set of users (e.g., those users within a virtual barrier or custom-space-fence). The determination is made based on a selection criterion (e.g., threshold value) with respect to the geo-fence opportunity event. In embodiments, the selection criterion includes an evaluation of the set of dynamic user data with respect to a set of demographic data or a set of historical data (e.g., those users fitting a particular demographic such as age-range or with a history of purchasing a specific service or type of product).

In embodiments, determining to provide the opportunity for the subset of the set of users includes a set of operations. A first portion of the set of users may be ascertained at block 356. The first portion can include those users that achieve the selection criterion (e.g., running a certain social media application and at least 25 years old but not more than 40 years old). A second portion of the set of users may be ascertained at block 357. The second portion can include those users separated by a geo-fence associated with the geo-fence opportunity event (e.g., those users internal to a connected array of points which form a polygon). By comparing the first and second portions of the set of users, a third portion of the set of users which is included in both the first and second portions of the set of users is determined at block 358.

At block 370, the opportunity is provided for/to the subset of the set of users. In embodiments, providing the opportunity for the subset of the set of users includes sending a notification to engage the subset of the set of users at block 372 (e.g., offer for discounted or faster service). In embodiments, providing the opportunity for the subset of the set of users includes routing the set of dynamic user data for data analysis with respect to the subset of the set of users at block 374. Data analysis may include a process of inspecting, cleaning, transforming, or modeling data to discover useful information, suggest conclusions, or support decisions. Data analysis can extract information/patterns from a data set and transform/translate it into an understandable structure (e.g., a data report which can be provided/furnished) for further use.

In embodiments, the set of dynamic user data is monitored for a user geo-location shift (e.g., user movement with respect to a scale). Based on the set of dynamic user data, the user geo-location shift may be detected. Based on the user geo-location shift (e.g., using from/to coordinates), it can be determined to establish/create a geo-fence. Accordingly, the geo-fence may be established corresponding to the user geo-location shift (e.g., to move/generate a virtual barrier with respect to a like group of users or data objects). In embodiments, an establishment of another geo-fence may be prevented for a threshold temporal period (e.g., geo-fence establishment using similar data only once per minute).

Method 300 concludes at block 399. Aspects of method 300 may provide performance or efficiency benefits of geo-fence management using a cluster analysis technique. For example, aspects of method 300 may include positive impacts on flexibility and responsiveness when providing opportunities using geo-fencing. Altogether, performance or efficiency benefits when managing geo-fences may occur (e.g., speed, flexibility, responsiveness, resource usage).

Figure 4:
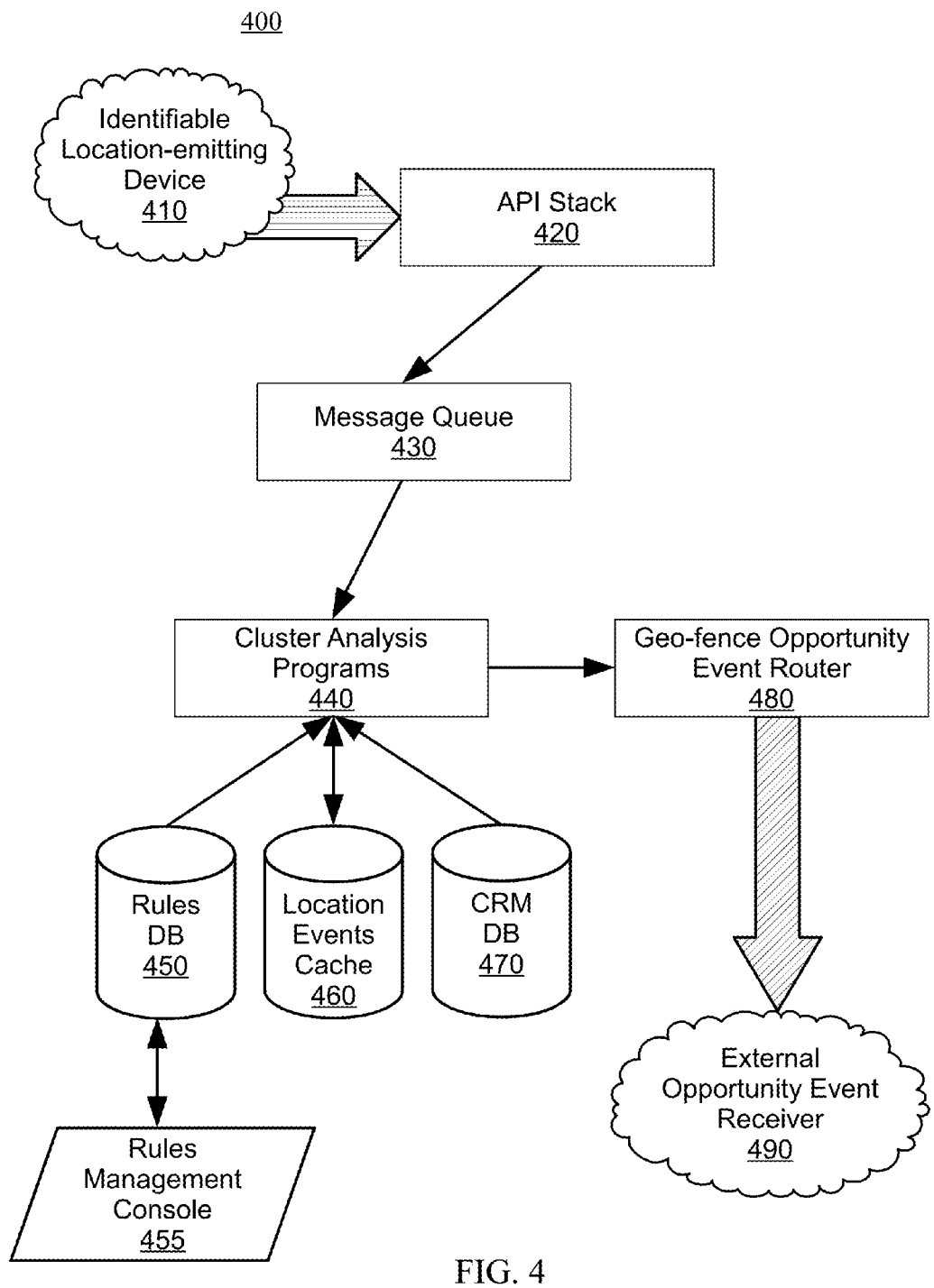
FIG. 4 shows a system of geo-fence management using a cluster analysis technique according to embodiments.

FIG. 4 shows a system 400 of geo-fence management using a cluster analysis technique according to embodiments. Aspects of the discussion related to FIG. 3 and method 300 may be used/applied/implemented in the system 400. A device (410) that emits location data (geographical, beacon, or custom defined) can post current location information to an application program interface (API) end-point. In addition, the user's device identifier (or other established unique user identifier) may be published. Also, application context (for virtual segmentation of user data) can be transmitted. In system 400, connectivity and data transfer may be enabled (e.g., from device 410) through software development kit (SDK) integration.

An API stack (420) may be configured to receive individual location updates and post to a message queue (430). The message queue (430) can facilitate horizontal scalability through the introduction of "n" number of cluster analysis processing programs. These programs can consume location message payloads as they are enqueued. Cluster analysis programs (440) may apply a user-defined cluster algorithm that can be used to identify concentrations of relevant users. The cluster analysis programs (440) can query a customer relationship management (CRM) database to match up demographic and historical event attributes (e.g., to fine-tune the geo-fence opportunity). If a concentration of users matches a rule, an opportunity event may passed to a geo-fence opportunity event router (480), and sent out to systems of engagement (for messaging and/or analytics). The geo-fence opportunity can include a polygon (array of points), or a circle (point and radius).

Database (450) can host rules for utilization with respect to application context. Cache (460) may be utilized by the clustering algorithm processors. Connection to a CRM database (470) may be included for use by the cluster analysis programs with respect to user demographics and historical user event querying. Event router (480) can post geo-fence opportunity events to external services. A receiving system (490) may receive the opportunity event and use the geo-fence opportunity event for engagement or analytics. Console (455) can provide a management-user with configuration options with respect to the appropriate clustering method for processing (e.g., related to an incoming application context). Management-users can define geo-fence types (e.g., polygon, circle), maps (e.g., a physical store, "the search", a custom/virtual space indicated by the application context), or the end-point for posting opportunity events. Aspects of system 400 may save resources such as bandwidth, processing, or memory (e.g., faster provision of opportunities).

Figure 5:
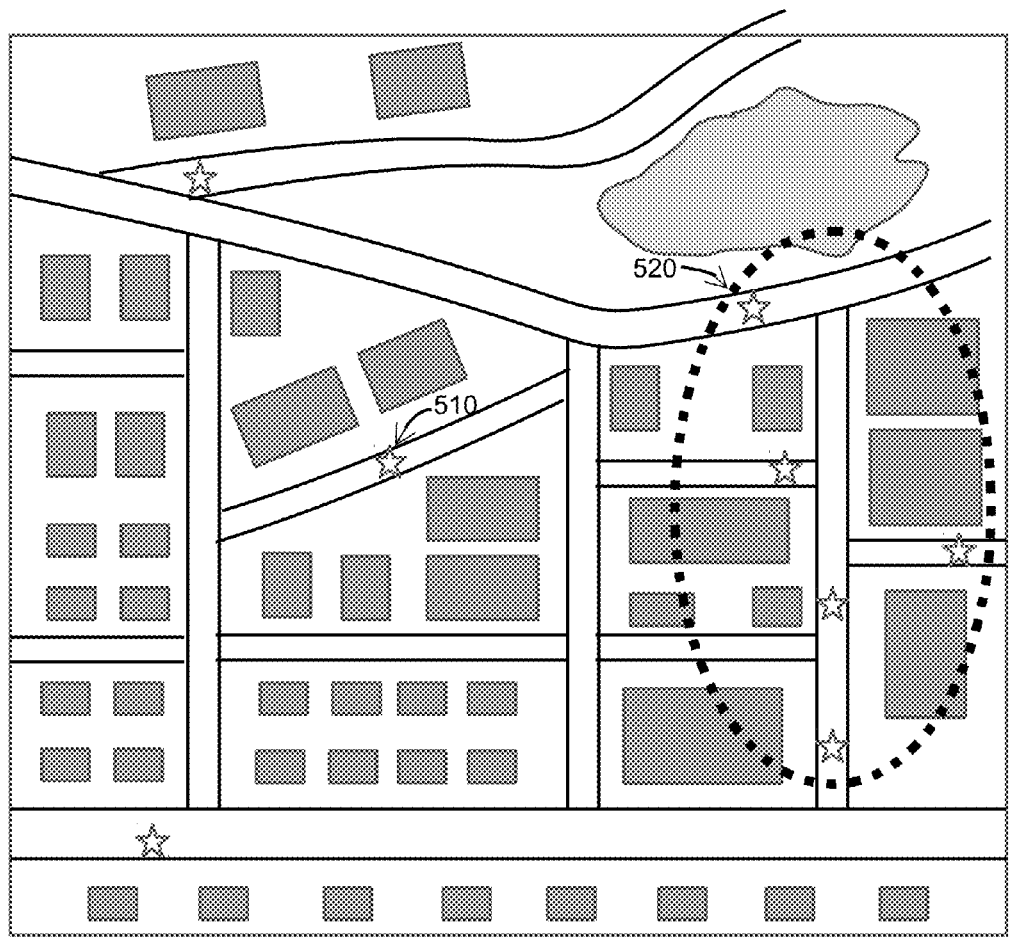
FIG. 5 shows an example use-case of geo-fence management using a cluster analysis technique according to embodiments.

FIG. 5 shows an example use-case of geo-fence management using a cluster analysis technique according to embodiments. Aspects of the present disclosure, in embodiments, are directed toward dynamically determining placement of geo-fence locations to determine an opportunity for a subset of a set of users. In embodiments, aspects of the present disclosure may be directed toward applications for managing (public) transportation systems. More particularly, geo-fence management techniques may be used to facilitate deployment, acquisition, and management of taxi and ride-sharing services. Consider the following example. In an urban or suburban environment, the location of deployed drivers throughout a particular area may be analyzed and clusters of drivers may be determined. As shown in FIG. 5 and map 500, the star symbols 510 may represent the location of taxi or ride-sharing service drivers in a particular area. In embodiments, large geo-fences may be placed around areas in which there is a particularly high density of drivers. For instance, referring to map 500, a geo-fence 520 may be placed around the cluster of drivers in the east portion of the map. Users who enter the geo-fence 520 may receive a notification (e.g. via smart phone) that there are a number of available drivers within the vicinity of the user. Accordingly, users who know that there are a large number of available drivers nearby may be more likely to enlist the services of a taxi or ride-sharing service. In certain embodiments, user data may be collected from users who enter the geo-fence 520 to determine whether the user is currently on foot or in a vehicle. Accordingly, in certain embodiments, notifications of available drivers in the area may only be sent to those individuals who are on foot (e.g. users already driving vehicles, riding bicycles, or engaged in another form of transportation may have a lower likelihood of desiring taxi or ride-sharing services). Other methodologies of determining the placement of geo-fence are also possible.

Figure 6:
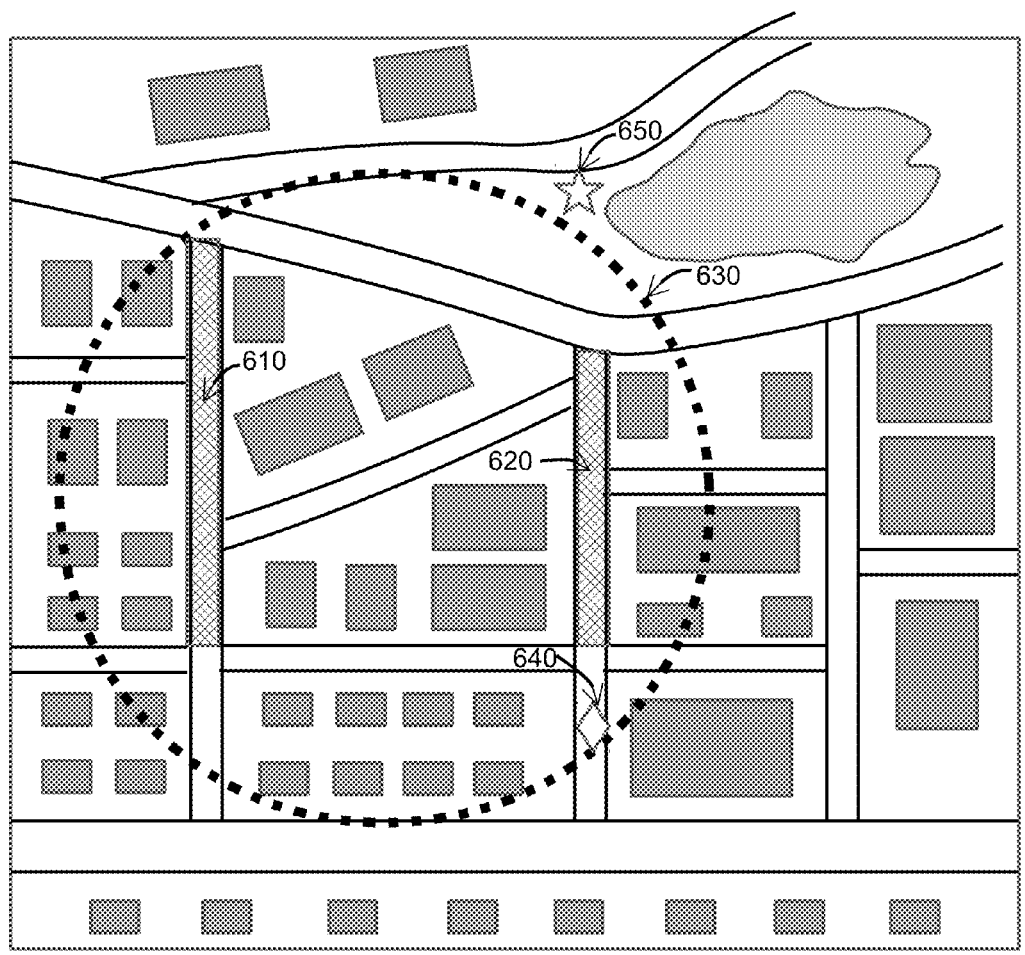
FIG. 6 shows an example use-case of geo-fence management using a cluster analysis technique according to embodiments.

FIG. 6 shows an example use-case of geo-fence management using a cluster analysis technique according to embodiments. Aspects of the present disclosure, in embodiments, are directed toward dynamically determining placement of geo-fence locations to determine an opportunity for a subset of a set of users. In embodiments, aspects of the present disclosure may be directed toward applications for facilitating avoidance of traffic congestion. In certain situations, drivers may encounter slowdown, traffic jams, construction zones, and other potential obstacles as they travel toward their destination. Accordingly, aspects of the present disclosure are directed toward placing geo-fences around highly congested areas such that users that enter the geo-fence may be alerted of the congestion, and may then adjust their course to avoid the slowdown. In embodiments, the location of geo-fences may change dynamically based on the state of congestion of the area and the movement of traffic. For example, referring now to FIG. 6 and map 600, areas 610 and 620 may be areas of congestion, and the method 300 may be configured to place a geo-fence 630 around areas 610 and 620. Accordingly, a user who is located at point 640 and wishes to go to point 650 may receive a notification of the congested areas upon entering the geo-fence, and may adjust his or her course to avoid the congestion. In certain embodiments, the placement of the geo-fence may be based on a density threshold. The density threshold may be a specification, criterion or guideline that serves as a quantitative reference for evaluating the state of congestion of the area. For example, the density threshold may expressed as a number of cars per given area (e.g., 30 cars per square mile). Areas that exceed the density threshold may be targets for geo-fence placement. Users that enter the geo-fenced area may receive a notification alerting them of the congestion. In embodiments, the notification may be delivered as a text/video/voice-message to the smart phone of the user, or to a communication system of a vehicle. Other methodologies of determining the placement of geo-fence are also possible.

Figure 7:
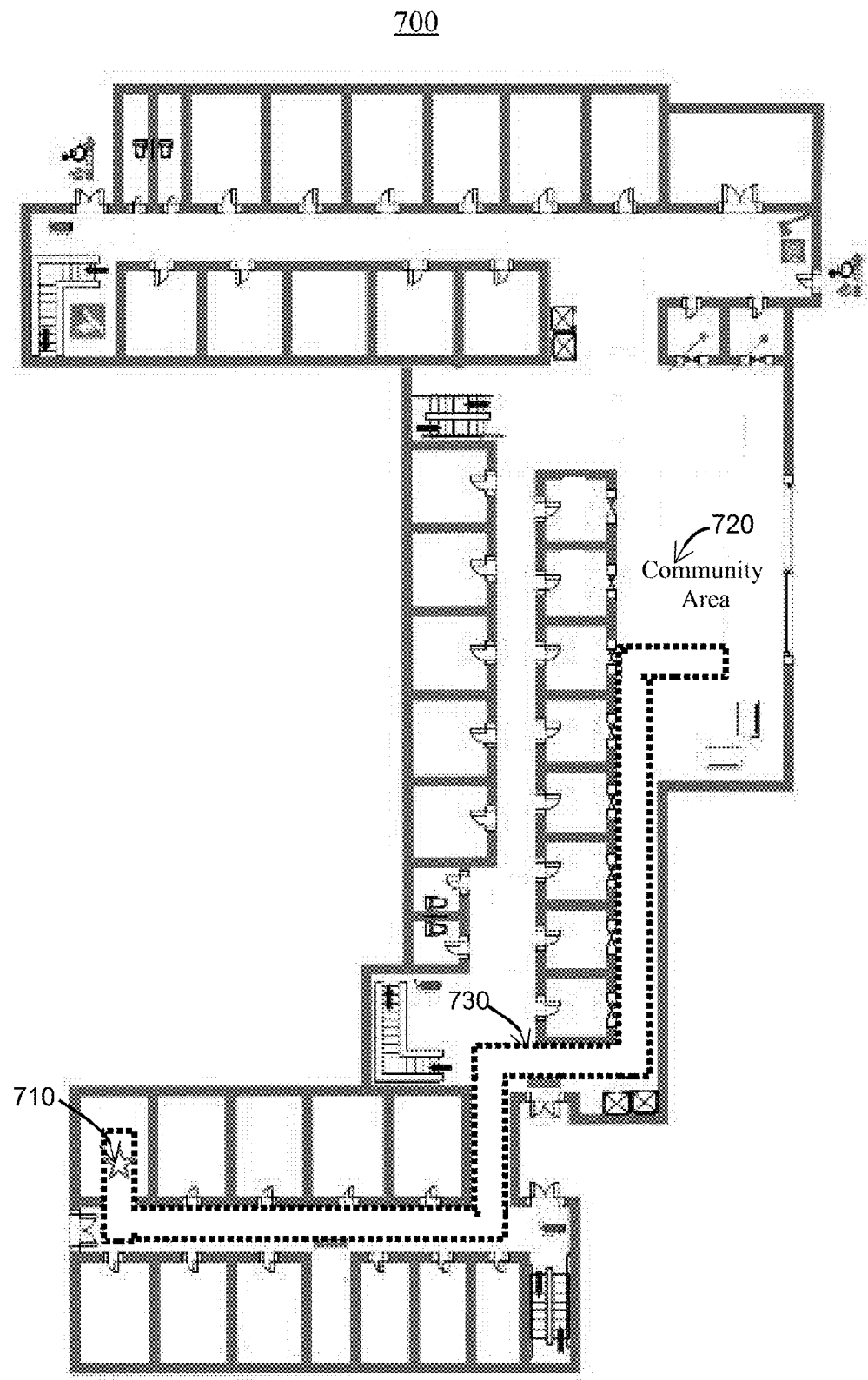
FIG. 7 shows an example use-case of geo-fence management using a cluster analysis technique according to embodiments.

FIG. 7 shows an example use-case of geo-fence management using a cluster analysis technique according to embodiments. Aspects of the present disclosure, in embodiments, are directed toward dynamically determining placement of geo-fence locations to determine an opportunity for a subset of a set of users. In embodiments, aspects of the present disclosure may be directed toward applications for providing assistance (e.g. navigational assistance) to individuals in a health-care setting. In certain configurations, hospital patients may face challenges navigating to a desired location in a hospital (e.g., hospitals may be large, with many similar looking areas and branching corridors). Accordingly, the placement of geo-fences may be used to guide the user from one location to another. The placement of the geo-fences may be dynamically changed and updated based on the needs and desires of the user. As described herein, the method 300 may be configured to receive a set of dynamic user data including information about the identity, location, and context of the user. For example, in embodiments the method 300 may be configured to prompt the user for the set of dynamic user data by audibly asking the user a series of questions such as their name, their location, and their destination within the hospital (e.g., questions may be asked via a smart phone, tablet, or other device). The user may respond by speaking the answers to the questions. Based on the collected dynamic user data, the method 300 may be configured to establish a geo-fence route to guide the user from their location to their destination. For instance, referring now to FIG. 7 and layout 700, a user located at point 710 may express a desire to go to area 720 (e.g., there may be a community Bingo game in which the user wishes to participate). Accordingly, a geo-fence 730 may be placed to create a route directing the user to area 720. In embodiments, a notification may be provided to an administrator (e.g., doctor, nurse, care provider for the individual) to inform them of the user's destination. Additionally, a notification may be provided to the user, administrator, other individual in the event that the user leaves the geo-fenced area (e.g., deviates from the path). Other methodologies of determining the placement of geo-fence are also possible.

Aspects of the present disclosure, in embodiments, are directed toward dynamically determining placement of geo-fence locations to determine an opportunity for a subset of a set of users. In embodiments, aspects of the present disclosure may be directed toward applications for crowd-management at events attended by large numbers of people, such as concert venues and stadiums. Consider the following example. At a sporting event held in a stadium attended by a large number of people, geo-fences could be placed around particular sections of seats, with the attendees seated in that section receiving a notification indicating that it is their turn to exit the main area in order to visit the restroom or purchase concessions. Accordingly, groups could be staggered to alleviate the congestion of a large number of people exiting the main area simultaneously. In embodiments, the geo-fence locations may be dynamically determined based on the density of people in a particular seating section (e.g., if two sections have a fewer number of people they may be called simultaneously, while full sections may be called one at a time). Further, in certain embodiments discounts on concessions may be offered to attendees who wait until their seating section is notified to exit the venue. The placement of geo-fences may be determined in one of a number of ways, such as the section that cheers the loudest at a concert, the section that maintains the cleanest seating area (e.g., lack of litter), or other condition. Other methodologies of determining the placement of geo-fence are also possible.

Aspects of the present disclosure, in embodiments, are directed toward dynamically determining placement of geo-fence locations to determine an opportunity for a subset of a set of users. In embodiments, aspects of the present disclosure may be directed toward applications for streamlining customer shopping experiences. More particularly, aspects of the present disclosure relate to the recognition that, in certain situations, being in the right location at the right time to acquire a popular product may pose challenges for some users. Accordingly, the method 300 may be configured to analyze historical data for past user interactions, past geo-fence location data, product release data, product stock data, and user context data to identify time-sensitive placement for a new geo-fence location. Consider the following example. Following the release of a new product revision in a popular line of smart phones, stock of the smart phone may be scarce, and sell out quickly after new shipments arrive. Accordingly, upon receiving a new shipment of the smart phone, geo-fences may be placed in high traffic areas to notify consumers of the new shipment, as well as the location where the shipment was received. In certain embodiments, the placement of the geo-fences may be correlated with the arrival times of public transportation such as train, bus, or subway times, such that users arriving at a station nearby the shopping area that has stock of the product may receive notification. In certain embodiments, user context data including user profile data and past purchasing trends may be collected for users in multiple areas and analyzed to evaluate the potential interest or likelihood that users will purchase the product. In embodiments, the level of user interest may be quantitatively evaluated and compared to a user interest threshold. Accordingly, geofences may be placed in the locations that correspond to user interest levels that achieve the user interest threshold. Other methodologies of determining the placement of geo-fence are also possible.

In addition to embodiments described above, other embodiments having fewer operational steps, more operational steps, or different operational steps are contemplated. Also, some embodiments may perform some or all of the above operational steps in a different order. The modules are listed and described illustratively according to an embodiment and are not meant to indicate necessity of a particular module or exclusivity of other potential modules (or functions/purposes as applied to a specific module).

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

Embodiments of the present disclosure may also be delivered as part of a service engagement with a client corporation, nonprofit organization, government entity, internal organizational structure, or the like. These embodiments may include configuring a computer system to perform, and deploying software, hardware, and web services that implement, some or all of the methods described herein. These embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to exemplary embodiments, other and further embodiments of the invention may be devised without departing from the basic scope thereof, and the scope thereof is determined by the claims that follow. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method of geo-fence management using a cluster analysis technique, the method comprising:
   receiving, from a set of users, a set of dynamic user data having:
      identification information which identifies one or more users,
      location information which indicates location for one or more users, and
      context information which indicates application context for one or more users;
   detecting, using the cluster analysis technique to process the set of dynamic user data, a geo-fence opportunity event;
   determining, based on a selection criterion with respect to the geo-fence opportunity event, to provide an opportunity for a subset of the set of users, including:
      ascertaining a first portion of the set of users which achieve the selection criterion,
      ascertaining a second portion of the set of users separated by a geo-fence associated with the geo-fence opportunity event, and determining, by comparing the first and second portions of the set of users, a third portion of the set of users which is included in both the first and second portions of the set of users; and providing the opportunity for the subset of the set of users.

2. The method of claim 1, wherein the set of dynamic user data includes real-time user data, and wherein a management-user selects both the cluster analysis technique and the selection criterion.

3. The method of claim 1, wherein the cluster analysis technique utilizes demographic information with respect to real-time location events to offer opportunities for engagement or analytics.

4. The method of claim 1, wherein the cluster analysis technique supports geo-fencing with respect to at least one of: an array of points or a radius from a point.

5. The method of claim 1, wherein the cluster analysis technique supports geo-fencing based on location and proximity data using technology selected from at least one of a group consisting of: near field communication (NFC), tags, radio-frequency identification (RFID), a wireless local area network (WLAN/Wi-Fi), cell, sensor, or beacon.

6. The method of claim 1, wherein the set of dynamic user data is received by a service which supports user registration, selection criteria, opportunity notification, and an interface for a management-user.

7. The method of claim 1, wherein detecting, using the cluster analysis technique to process the set of dynamic user data, the geo-fence opportunity event includes:

monitoring the set of dynamic user data for a triggering event;

identifying, based on the triggering event with respect to the set of dynamic user data, a trend; and determining, by comparing the trend with a group of opportunity events, the trend indicates the geo-fence opportunity event.

8. The method of claim 1, wherein the selection criterion includes an evaluation of the set of dynamic user data with respect to at least one of: a set of demographic data or a set of historical data.

9. The method of claim 1, wherein the geo-fence opportunity event includes a concentration of the subset of users with respect to a geo-location.

10. The method of claim 1, wherein providing the opportunity for the subset of the set of users includes sending a notification to engage the subset of the set of users.

11. The method of claim 1, wherein providing the opportunity for the subset of the set of users includes routing the set of dynamic user data for data analysis with respect to the subset of the set of users.

12. The method of claim 1, further comprising:

monitoring the set of dynamic user data for a user geo-location shift;

detecting, based on the set of dynamic user data, the user geo-location shift;

determining, based on the user geo-location shift, to establish a geo-fence; and establishing the geo-fence corresponding to the user geo-location shift.

13. The method of claim 12, further comprising preventing an establishment of another geo-fence for a threshold temporal period.

14. A system for geo-fence management using a cluster analysis technique, the system comprising:

a memory having a set of computer readable computer instructions, and a processor for executing the set of computer readable instructions, the set of computer readable instructions including:

receiving, from a set of users, a set of dynamic user data having:

identification information which identifies one or more users, location information which indicates location for one or more users, and context information which indicates application context for one or more users;

detecting, using the cluster analysis technique to process the set of dynamic user data, a geo-fence opportunity event;

determining, based on a selection criterion with respect to the geo-fence opportunity event, to provide an opportunity for a subset of the set of users, including:

ascertaining a first portion of the set of users which achieve the selection criterion, ascertaining a second portion of the set of users separated by a geo-fence associated with the geo-fence opportunity event, and determining, by comparing the first and second portions of the set of users, a third portion of the set of users which is included in both the first and second portions of the set of users; and providing the opportunity for the subset of the set of users.

15. The system of claim 14, wherein the set of dynamic user data includes real-time user data, and wherein a management-user selects both the cluster analysis technique and the selection criterion.

16. The system of claim 14, wherein the cluster analysis technique utilizes demographic information with respect to real-time location events to offer opportunities for engagement or analytics.

17. A computer program product for geo-fence management using a cluster analysis technique, the computer program product comprising a computer readable storage medium having program instructions embodied therewith, wherein the computer readable storage medium is not a transitory signal per se, the program instructions executable by a processor to cause the processor to perform a method comprising:

receiving, from a set of users, a set of dynamic user data having:

identification information which identifies one or more users, location information which indicates location for one or more users, and context information which indicates application context for one or more users;

detecting, using the cluster analysis technique to process the set of dynamic user data, a geo-fence opportunity event;

determining, based on a selection criterion with respect to the geo-fence opportunity event, to provide an opportunity for a subset of the set of users, including:

ascertaining a first portion of the set of users which achieve the selection criterion, ascertaining a second portion of the set of users separated by a geo-fence associated with the geo-fence opportunity event, and determining, by comparing the first and second portions of the set of users, a third portion of the set of users which is included in both the first and second portions of the set of users; and providing the opportunity for the subset of the set of users.

18. The computer program product of claim 17, wherein the program instructions are stored in the computer readable storage medium in a data processing system, and wherein the program instructions were downloaded over a network from a remote data processing system.

19. The computer program product of claim 17, wherein the program instructions are stored in the computer readable storage medium in a server data processing system, and wherein the program instructions are downloaded over a network from a remote data processing system for use in a second computer readable storage medium with the remote data processing system.

* * * * *